(12) United States Patent
Ragunathan et al.

(10) Patent No.: US 11,847,181 B2
(45) Date of Patent: Dec. 19, 2023

(54) UPDATING A SEARCH PAGE UPON RETURN OF USER FOCUS

(71) Applicant: Microsoft Technology Licensing, LLC, Redmond, WA (US)

(72) Inventors: Hariharan Ragunathan, Bellevue, WA (US); Marcelo Medeiros De Barros, Redmond, WA (US); Sarah Jiaxuan Liu, Seattle, WA (US); Benjamin David Brubaker, Seattle, WA (US); Rahul Lal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/792,121

(22) Filed: Feb. 14, 2020

(65) Prior Publication Data

US 2021/0256083 A1    Aug. 19, 2021

(51) Int. Cl.
*G06F 16/95* (2019.01)
*G06F 16/9538* (2019.01)
*G06F 16/957* (2019.01)

(52) U.S. Cl.
CPC ...... *G06F 16/9538* (2019.01); *G06F 16/9577* (2019.01)

(58) Field of Classification Search
CPC .............. G06F 16/9577; G06F 16/951; G06F 16/9535; G06F 16/958; G06F 16/248
See application file for complete search history.

(56) References Cited

U.S. PATENT DOCUMENTS

| | | | |
|---|---|---|---|
| 8,051,064 B2 | 11/2011 | Wen et al. | |
| 9,367,621 B2 | 6/2016 | Wen et al. | |
| 11,054,962 B1* | 7/2021 | Chang | G06F 3/0481 |
| 2002/0010769 A1* | 1/2002 | Kippenhan, III | G06Q 10/087 709/223 |
| 2004/0064442 A1* | 4/2004 | Popovitch | G06F 16/951 |
| 2008/0071763 A1 | 3/2008 | Ferrenq et al. | |
| 2008/0072180 A1 | 3/2008 | Chevalier et al. | |
| 2008/0289029 A1* | 11/2008 | Kim | G06F 16/9577 726/12 |
| 2010/0153544 A1* | 6/2010 | Krassner | G06F 16/9577 709/224 |

(Continued)

OTHER PUBLICATIONS

"International Search Report and Written Opinion Issued in PCT Application No. PCT/US21/014033", dated May 19, 2021, 15 Pages.

*Primary Examiner* — Mohammad S Rostami
(74) *Attorney, Agent, or Firm* — CALFEE, HALTER & GRISWOLD LLP

(57) ABSTRACT

A "while away" canvas is described herein. A client computing device detects that a page that comprises search results is displayed on a display of the client computing device, wherein the search results were identified based upon a query received from the client computing device. The client computing device subsequently detects that focus of the user has left the page. Upon detecting that focus of the user has returned to the page, the client computing device updates the page to include the "while away" canvas, which identifies additional search results (based upon the query) that were published after the page that comprises the search results was initially displayed.

20 Claims, 12 Drawing Sheets

(56) References Cited

U.S. PATENT DOCUMENTS

| | | | |
|---|---|---|---|
| 2012/0084133 A1* | 4/2012 | Ross | G06Q 30/0226 |
| | | | 705/14.27 |
| 2012/0136894 A1 | 5/2012 | Marlow et al. | |
| 2014/0372512 A1* | 12/2014 | Clark | H04L 67/42 |
| | | | 709/203 |
| 2017/0132323 A1* | 5/2017 | Kuralenok | G06F 16/248 |
| 2017/0185368 A1* | 6/2017 | Handrigan | G06F 8/38 |
| 2018/0365334 A1* | 12/2018 | Semlani | G06F 40/295 |
| 2019/0392019 A1* | 12/2019 | Brannon | G06F 16/972 |
| 2021/0133274 A1* | 5/2021 | Chu | G06F 16/9577 |
| 2021/0181922 A1* | 6/2021 | Chang | G06F 3/01 |

* cited by examiner

USER QUERY  1002

SEARCH RESULT 1 TITLE
WWW.URL1.COM
XXX XXXXXXX XX XXX XXXXXXXXXXXX X
XXXXXXXXXXXXX XX XXXXX XXXXXXXXXXX XX
XXXXXXXXXXXX XXX XXXXX XXXXXXXXXX XX
XXXXXXXXXXX XXX XXXXXXXXX XXXXXXXXX XXXXX

SEARCH RESULT 2 TITLE
WWW.URL2.COM
XXX XXXXXXX XX XXX XXXXXXXXXXXX X
XXXXXXXXXXXXX XX XXXXX XXXXXXXXXXX XX
XXXXXXXXXXXX XXX XXXXX XXXXXXXXXX XX
XXXXXXXXXXX XXX XXXXXXXXX XXXXXXXXX XXXXX

SEARCH RESULT 3 TITLE
WWW.URL3.COM
XXX XXXXXXX XX XXX XXXXXXXXXXXX X
XXXXXXXXXXXXX XX XXXXX XXXXXXXXXXX XX
XXXXXXXXXXXX XXX XXXXX XXXXXXXXXX XX
XXXXXXXXXXX XXX XXXXXXXXX XXXXXXXXX XXXXX

1004

△
NEW RESULTS SINCE YOU LEFT

UPDATING A SEARCH PAGE UPON RETURN OF USER FOCUS

BACKGROUND

Computer-implemented search engines are configured to receive a query from a client computing device operated by a user, search over a computer-readable index to identify search results that are germane to the query, and transmit identifiers for the search results (uniform resource locators (URLs)) and descriptive information about the search results back to the client computing device. A web browser on the client computing device renders a search engine results page (SERP), wherein the SERP includes links to the search results and the descriptive information. When the user selects a link, a web browser loads a webpage to which the link points.

Search engines have become increasingly adept at presenting relevant information to users in response to receipt of queries. For example, a SERP generated by a search engine in response to receipt of a query may include directly thereon information being searched for by the user (e.g., the user need not select a link on the SERP to obtain the information being searched for by the user). For instance; the user may submit a query to a search engine that is related to a recent event. The search engine can identify a webpage that includes a news article that is relevant to the query, and the search engine can generate a SERP to be presented, wherein the SERP includes text extracted from the news article that the search engine has identified as being relevant to the query. Because the relevant information is displayed on the SERP, the user need not direct the web browser away from the SERP to obtain the information that is of interest to the user.

Conventional web browsers support tabs, and it has been observed that a significant number of users access a search engine, perform a search, and review some other content in a different tab without closing the SERP. For example, a user may navigate away from a SERP that is loaded in a first tab of a web browser and review a different webpage in a second tab while the SERP remains loaded in the first tab. Because information is generated so quickly (for instance, on news websites, new articles are constantly being created), when the user returns to the SERP, the information displayed thereon may be stale. In an example, if a user were to issue a query that is germane to a news event, the search engine will provide a SERP that includes links to webpages deemed relevant to the query by the search engine as well as information extracted from such webpages. When the user directs his or her focus to other content (e.g., opens a new tab, minimizes the browser to use another application, etc.), new webpages that include information about the news event may be generated. Thus, for instance, if the user returns to the SERP a half hour after issuing the initial query, three new articles about the news event may have been published but are not represented in the SERP. To review such new articles, the user must reissue the query to the search engine and identify which articles are new from amongst search results identified by the search engine.

SUMMARY

The following is a brief summary of subject matter that is described in greater detail herein. This summary is not intended to be limiting as to the scope of the claims.

Described herein are various technologies pertaining to a "while away" canvas that is presented on an electronic page (such as a webpage), wherein the canvas depicts information that was published subsequent to a user query being received, and further wherein the canvas is presented on the electronic page after the following events are detected: 1) that the electronic page was displayed upon a display to the user; 2) that focus of the user altered from the electronic page to other content; and 3) focus of the user returned to the electronic page. In an example, a web browser executing on a client computing device may be directed to an electronic page that is configured to receive a user query (such as a search engine homepage). The web browser receives a query from the user and causes the client computing device to transmits the query to a server computing system, wherein the server computing system is configured to: 1) search a computer-readable index based upon the query; 2) identify search results that are relevant to the query; and 3) return identifiers (URLs) for the search results and other information pertaining to the search results to the client computing device. In response to receiving the identifiers for the search results and the other information, the web browser updates the page to include an ordered set of links to the search results. The search results may include one or more search results identified by a vertical search module of the search engine, wherein the vertical search module is configured to search a computer-readable index that belongs to a particular domain (e.g. news, sports, finance, shopping, etc.). Hence, search results identified by the vertical search module are assigned to the particular domain.

The user of the client computing device may review the information presented on the electronic page, and then alter his or her focus from the electronic page to some other content that is displayed on the display of the client computing device. For example, the electronic page may be displayed in a first tab of the web browser, and the user may select or open a second tab in the web browser (without closing the first tab). In another example; the user may minimize an application window for the web browser. In still yet another example, the user may cause another application window to be displayed over the application window for the web browser. The client computing device can detect that the focus of the user has altered from the electronic page to some other content while the electronic page remains loaded by the application (e.g. the user has not closed the electronic page).

Upon detecting that the focus of the user has altered from the electronic page to the other content, the client computing device generates a timestamp that identifies a time when the focus of the user has shifted from the electronic page to the other content. After passage of some amount of time, the user may return his or her focus to the page. For instance, the user may select the first tab in the web browser that has the electronic page loaded therein, such that the user is again presented with the electronic page. The client computing device detects that the focus of the user has returned to the electronic page, and the client computing device transmits the timestamp (and optionally the query) to the server computing system. The server computing system, upon receiving the timestamp, performs another search (based upon the query) for search results (web pages) that were published subsequent to the timestamp. In other words, the server computing system searches for content that was published after the user initially submitted the query to the server computing system.

When the server computing system identifies a search result that was published subsequent to the received timestamp; the server computing system transmits an identifier (e.g., URL) for the search result and optionally other associated information to the client computing device. The client computing device, upon receiving the identifier for the search result and the other associated information, updates electronic page to include a representation of the search result (which may include an image, a descriptive title, text extracted from the search result, etc.). For example, the client computing device can update the electronic page to include a pop-up window that comprises the representation of the search result and a graphical indication that the search result was published after the user initially submitted the query to the server computing system. When a link to the search result is selected by, the user, the web browser can load an electronic page that is pointed to by the link.

The "while away" canvas referenced above presents the user with information that was unavailable to the user when the user initially submitted the query to the server computing system. In addition, such information is presented in a manner that does not unnecessarily use network bandwidth between the client computing device and the server computing system. For example, the server computing system does not provide the client computing device with an entirely new search results page; instead the server computing system transmits representations of search results that have become available since the user initially submitted the query. Furthermore, the approach described herein is distinct from conventional notification systems, which push information as such information is received. In contrast, the canvas described presents a representation of a search result only upon ascertaining that focus of the user has returned to the electronic page.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 10 depicts an exemplary electronic page configured for display on a mobile computing device, wherein the electronic page has a "while away" canvas presented thereon.

DETAILED DESCRIPTION

Figure 1:
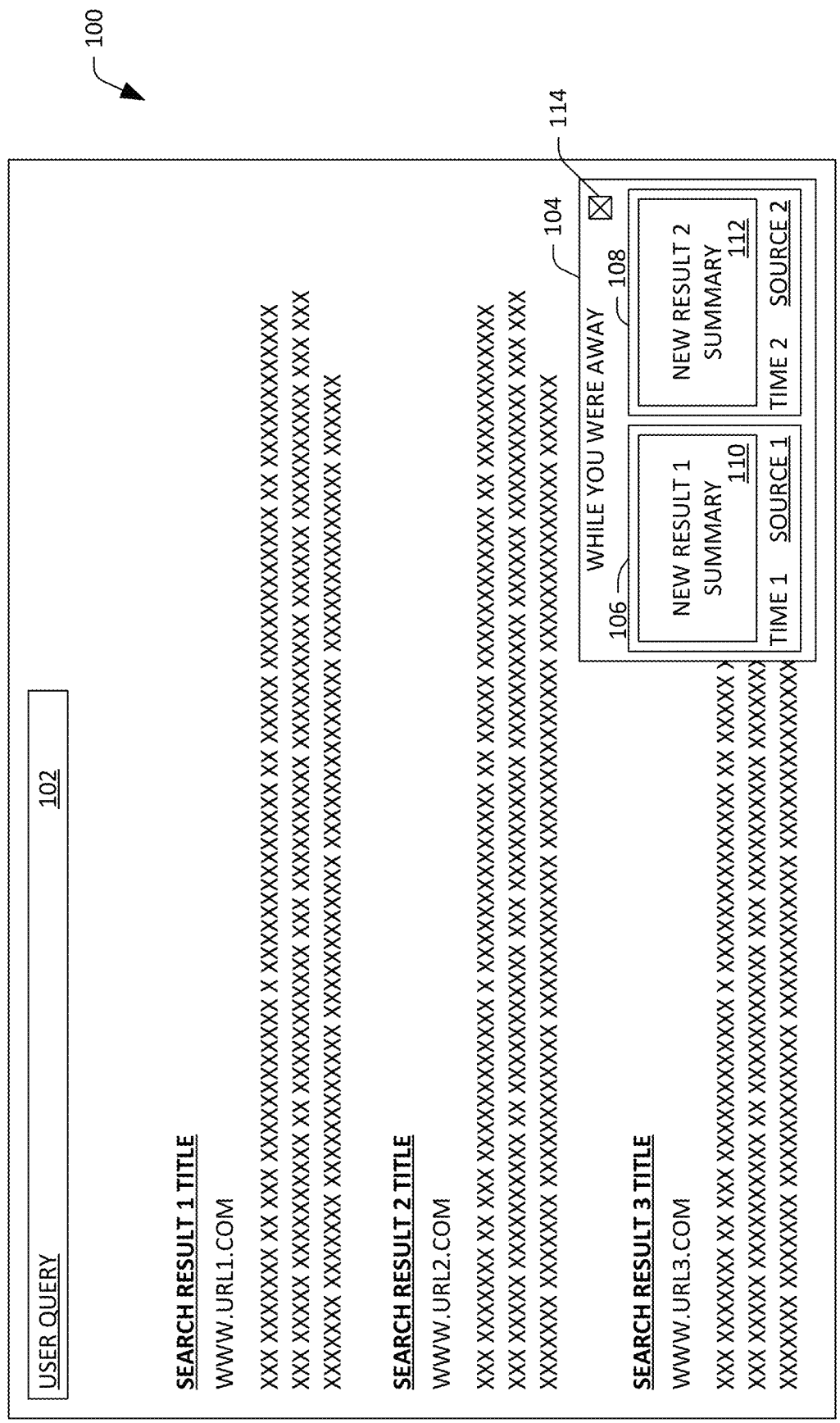
FIG. 1 depicts an exemplary electronic page that has been updated to depict a "while away" canvas, wherein the canvas includes a representation of a search result that was published subsequent to a user being provided with an initial set of search results.

Various technologies pertaining to generating and presenting a "while away" canvas are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices. Further, as used herein, the term "exemplary" is intended to mean serving as an illustration or example of something and is not intended to indicate a preference.

Various technologies are described herein that facilitate presentment of a "while away" canvas on an electronic page rendered by an application executing on a client computing device, wherein the electronic page depicts links to web pages returned to the client computing device by a server computing system based upon a query, and further wherein the page is updated to include the canvas, with the canvas comprising a link to a webpage that was published subsequent to the user initially setting forth the query to the client computing device. In more detail, technologies are described herein that facilitate detecting that the electronic page has been presented to the user on a display of the client computing device, detecting that the focus of the user has left the electronic page, and later detecting that the focus of the user has returned to the electronic page. Upon detecting that focus of the user has returned to the electronic page, a timestamp is transmitted to the server computing system, wherein the server computing system identifies a search result that was published subsequent to the timestamp (wherein the timestamp identifies one of a time that the user initially submitted the query or a time when focus of the user left the electronic page). An identifier for the search result and optionally other information that is germane to the search result is returned to the client computing device, and the client computing device updates the electronic page to include the canvas (e.g., in a pop-up window), where the canvas comprises a link to the search result. Hence, a "stale" search results page can be updated to include a link to a search result that was published subsequent to the search results page being initially provided to the client computing device.

With reference now to FIG. 1, an exemplary electronic page 100 that has been updated to comprise a "while away" canvas is illustrated. The page 100 is presented on a display of a client computing device. The page 100 includes a query field 102, wherein a user has set forth a user query into the query field 102 and caused the user query to be transmitted to a search engine executing on a server computing system. The search engine, upon receiving the query, identifies search results that are based upon the query and transmits identifiers for the search results (e.g., URLs) and other relevant data to the client computing device, wherein the client computing device renders representations of the search results on the page 100. Accordingly, as shown, the page 100 includes a plurality of links to the search results as well as snippets extracted from the search results that are representative of content of the search results.

As will be described in greater detail below, the user may navigate away from the page 100 after the page 100 is presented on the display of the client computing device. For instance, the page 100 may be displayed in a first browser tab, and the user may open or select a second browser tab, may cause a different application to be displayed over the page 100, may minimize the browser, may walk away from the client computing device such that the client computing device goes to sleep (e.g., a screen saver is shown), etc. Sometime later, the focus of the user returns to the page 100. In some cases, however, content depicted in the page 100 may be "stale". For example, when the user query set forth in the field 102 is directed towards a news event, several electronic articles related to the news event may be published after the user has directed the client computing device to transmit the query to the search engine. Thus, when the user returns his or her focus to the page 100, the search results represented in the page 100 may not represent e rest recent electronic articles.

When it is detected that the focus of the user has returned to the page 100, the page 100 is updated to include a "while away" canvas 104. In a first example, the canvas 104 is configured to depict representations of search results that were published between, for example, the time that the user initially caused the query to be submitted to the search engine and the time that the focus of the user returned to the page 100. In another example, the canvas 104 is configured to depict representations of search results that were published between, for example, the time that the focus of the user switched from the page 100 to other content and the time that the focus of the user returned to the page 100.

In the exemplary page 100 as depicted in FIG. 1, the canvas 104 includes representations 106 and 108 of two different search results that were published between a first time when focus of the user left the page 100 and a second time when the focus of the user returned to the page 100. In an example, the representations 106 and 108 can respectively include summaries 110 and 112 of the search results, wherein such summaries may include images, videos, snippets extracted from the search results, etc. The representations 106 and 108 can additionally include information that identifies a time when the search results represented by the representations 106 and 108 were published and sources of such search results (e.g., websites to which the search results respectively belong). The canvas 104 may also include a button 114 that can be selected by the user, wherein selection of the button results in the canvas 104 being removed from the page 100.

Figure 2:
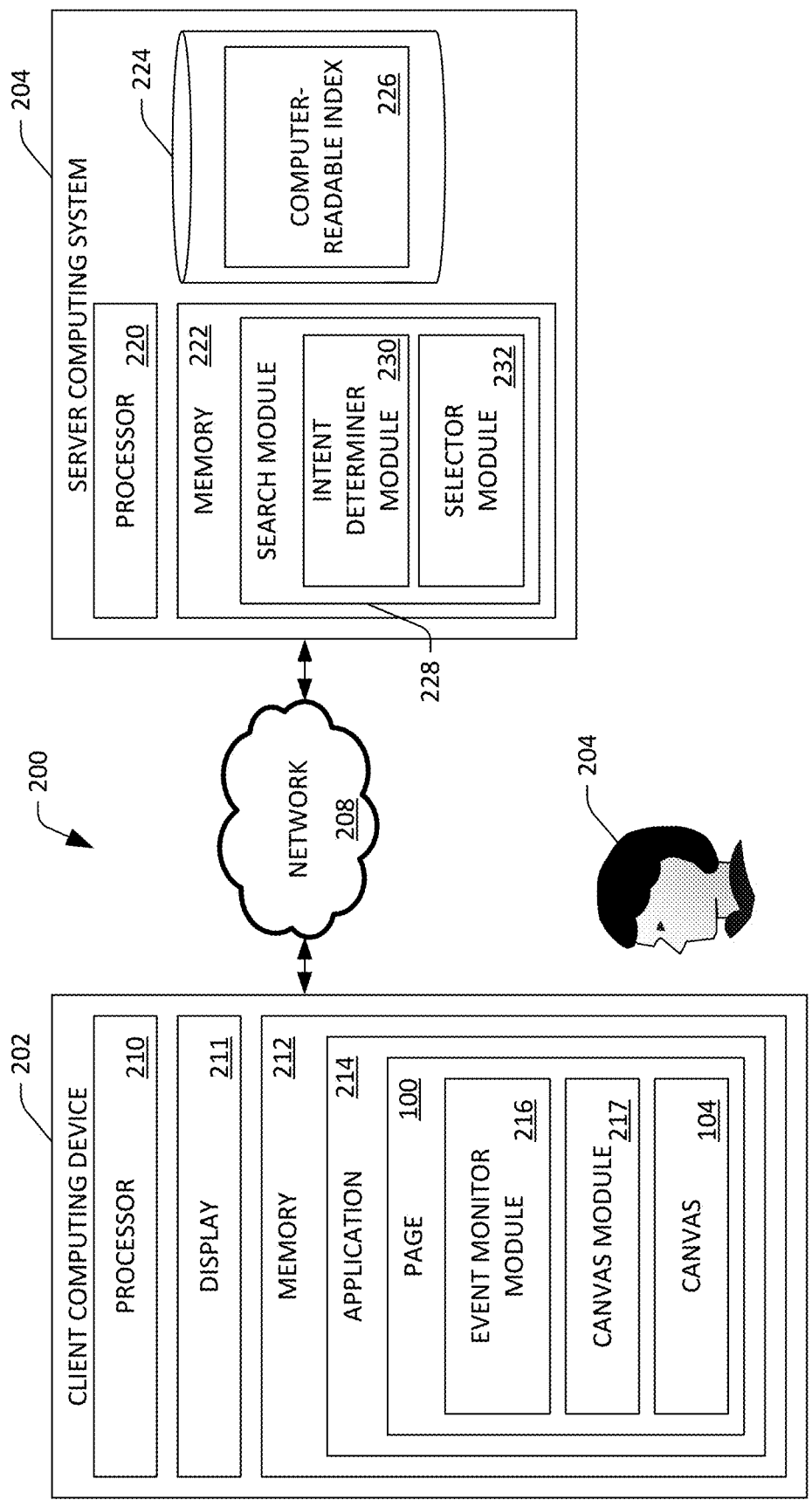
FIG. 2 is a functional block diagram of an exemplary computing system that is configured to update an electronic page to include a "while away" canvas.

Referring now to FIG. 2, a functional block diagram of an exemplary computing system 200 that facilitates generating the canvas 104 and updating the page 100 to include the canvas 100 is illustrated. The system 200 includes a client computing device 202 operated by a user 204 and a server computing system 206, wherein the client computing device 202 and the server computing system 206 are in communication with one another by way of a network 208. The client computing device 202 includes a processor 210, a display 211, and memory 212, wherein the memory 212 has instructions loaded therein that are executed by the processor 210. As depicted in FIG. 2, the memory 212 has an application 214 loaded therein. In an example, the application 214 can be a web browser. Further, the web browser may support tabs, wherein a first tab of the web browser may have a first page loaded therein while a second tab of the web browser may have a second page loaded therein. The application 214, in another example, may be any suitable application that can render HTML.

The application 214 has the page 100 loaded therein. As illustrated in FIG. 1, the page 100 includes representations (e.g., titles, hyperlinks, extracted snippets, extracted images, etc.) of search results that were identified based upon a query set forth by the user 204 to the application 214. Thus, as shown in FIG. 1, the page 100 can be a search engine results page (SERI)). In another example, however, the page 100 may be a page of a news website, wherein the page includes links to news articles that were identified based upon a query set forth by the user 204 to the application 214. In still yet another example, the page 100 may be a page that belongs to a marketplace website, wherein the page includes links to webpages that correspond to purchasable items that were identified based upon a query set forth by the user 204 to the application 214. Generally, therefore, it is understood that the page 100 includes links to webpages (search results) that were identified based upon a query submitted to the application 214 by the user 204.

The page 100 includes an event monitor module 216 that is configured to detect: 1) when the page 100 has been loaded by the application 214 and is displayed on the display 211; 2) when the focus of the user 204 has altered from the page 100 to some other content (e.g., other graphical content presented on the display 211 of the client computing device 202); and 3) when the focus of the user 204 has returned to the page 100 (after the focus of the user 204 had been upon some other content).

With respect to 1), application 214 may be a web browser, and the event monitor module 216, for example, can ascertain that the page 100 is loaded in a first tab of the web browser (and that the page 100 is being displayed on the display 211 in the first tab). With respect to 2), the event monitor module 216 can detect that the focus of the user 204 has altered from the page 100 to some other content by, for instance, detecting that the user 204 has selected a second tab in the web browser that is different from the first tab. In another example, the event monitor module 216 can detect that an application window for the application 214 has been minimized on the display 211. In yet another example, the event monitor module 216 can detect that the client computing device 202 has entered sleep mode (or that a screen saver has been initiated automatically by the client computing device 202 or by the user 204). In still yet another example, the event monitor module 216 can detect that a second application (not shown) that is loaded in the memory 212 has been selected by the user 204. In another example, the event monitor module 216 can detect that the application window for the application 214, and thus the page 100, has been moved on the display 211 such that the page 100 is not in a viewing region on the display 210. Other examples are also contemplated.

With respect to 3), the event monitor module 216 can detect that the first tab of the web browser that has the page 100 loaded therein has been selected by the user 204. In another example, the event monitor module 216 can detect that the application window of the application 214 has been restored (transitioned away from being minimized). In yet another example, the event monitor module 216 can detect that the client computing device 202 has exited sleep mode. In still yet another example, the event monitor module 216 can detect that that the application window of the application 214 has been move such that the page 100 is in a viewable region on the display 211.

The page 100 additionally includes a canvas module 217 that is configured to update the page 100 to include the canvas 104 upon receipt of information pertaining to search results from the server computing system 206, wherein the search results have timestamps assigned thereto that are subsequent to a time when the event monitor module 216 detected that the page 100 was loaded by the application 214 and displayed on the display 211. For example, the canvas module 217 can define potential size(s) of the canvas 104, can render HTML provided by the server computing system 206, etc.

The server computing system 206 includes a processor 220 and memory 222, wherein the memory 222 has computer-executable instructions loaded therein that are executed by the processor 220. The server computing system 206 also includes a data store 224 that comprises at least one computer-readable index 226. As will be described in greater detail below, the computer-readable index 226 can be a general-purpose search engine index or a vertical search index that is specific to a domain from amongst a predefined set of domains. A vertical search module corresponds to the vertical search index, wherein the vertical search module is configured to search the vertical search index (and only the vertical search index) and rank search results represented in the vertical search index. For example, a "news" vertical search module can search, based upon a query, over a computer-readable index that indexes news articles (e.g., extracted from, for example, a predefined set of websites that are known to publish news articles) to identify a set of news articles that are relevant to the query. The "news" vertical search module is further configured to rank such news articles. In another example, a "sports" vertical search module can search, based upon a query, over a computer-readable index that indexes sports articles (e.g., extracted from, for example, a predefined set of websites that are known to publish sports articles) to identify a set of sports articles that are relevant to the query. The "sports" vertical search module is further configured to rank such sports articles.

The memory 222 comprises a search module 228 that is configured to search the computer-readable index 226 and identify (and rank) search results based upon the received query. As noted above, the search module 228 can be a general-purpose search module or a vertical search module. The search module 228, in an example, can include an intent determiner module 230 that can disambiguate an information retrieval intent of the user 204 based upon a query issued by the user 204 to the client computing device 202. Further, the intent determiner module 230, in an exemplary embodiment, can disambiguate the information retrieval intent of the user 204 based upon queries previously submitted by the user 204 to the search module 228 during a search session, based upon link(s) selected by the user 204 in SERP(s) provided to the user 204 during a search session (wherein a search session comprises interactions by the user 204 with the search module 230, where each of the interactions occurs within a threshold amount of time from at least one other interaction). In another exemplary embodiment, the intent determiner module 230 can disambiguate the information retrieval intent of the user 204 based upon a profile of the user (e.g. when the user 204 has provided sign-in information to the application 214, and the profile includes user history, explicitly provided user preferences, etc.).

The search module 228 is configured to perform two searches over the computer-readable index 226 based upon the query: a first search when the user 204 submits the query to the application 21A, and a second search when the event monitor module 216 detects that focus of the user 204 has returned to the page 100. The search module 228 also includes a selector module 232 that is configured to select a search result identified by the search module 228 in the second search, wherein the search result selected by the selector module 232 has been published subsequent to when the event detector module 216 detected that the application 214 had loaded the page 100 and that the page 100 was displayed on the display 211. Put differently, the selector module 232 selects a search result that was unavailable to the search module 228 (e.g., not represented in the computer-readable index 226) during the first search performed by the search module 228. The search module 228 is then configured to transmit information about the search result identified by the selector module 232 to the client computing device 202, whereupon the canvas module 217 causes the page 100 to be updated to include the canvas 104, wherein the canvas 104 includes a representation of the search result.

Figure 3:
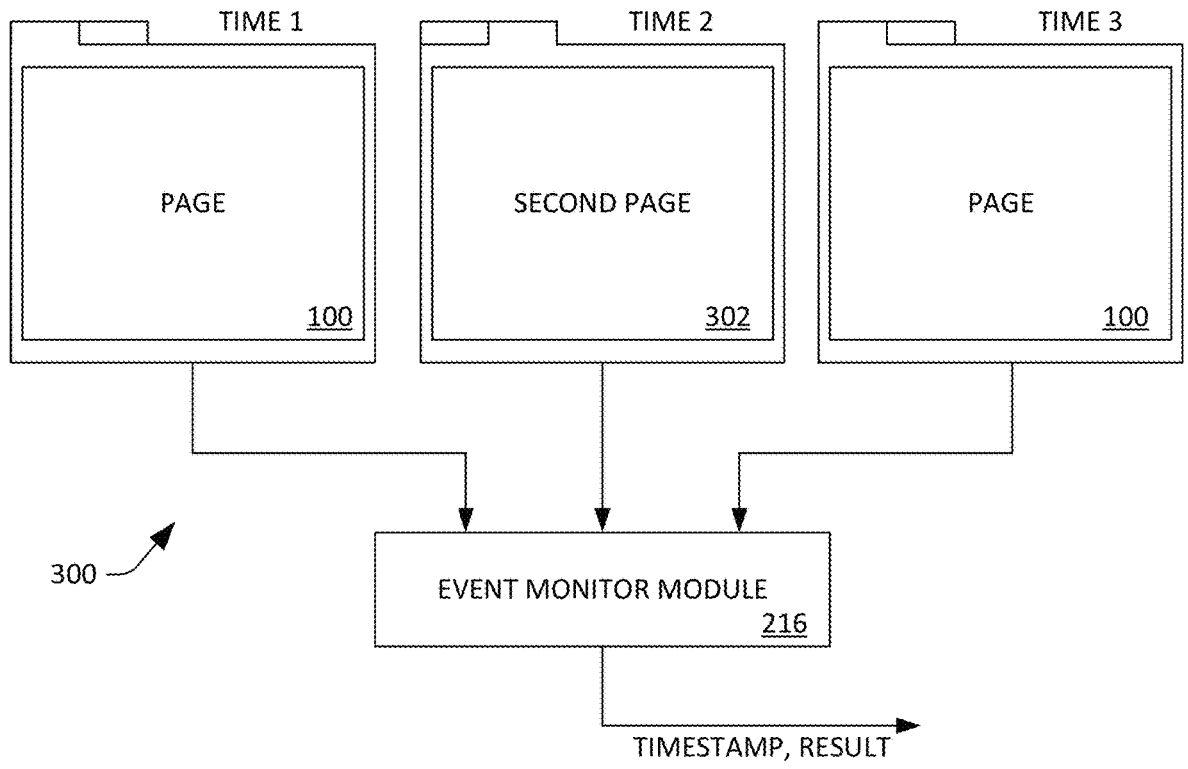
FIG. 3 is a block diagram of an exemplary event monitor module that is configured to detect when a user focuses on a search results page, alters focus from the search results page to some other content, and then returns focus to the search results page.

Referring now to FIG. 3, a diagram 300 illustrating operation of the event monitor module 216 is depicted. As illustrated in the diagram 300, the event monitor module 216 detects that at TIME 1 the page 100 is loaded in a first tab of the application 214 and that the page 100 is viewable to the user 204 on the display 211 of the client computing device 202. Optionally, the event monitor module 216 can generate a timestamp that identifies a time when the page 100 was loaded in the first tab and displayed on the display 211 (TIME 1). Later, at TIME 2, the user 204 selects a second tab of the application 214, causing a second page 302 to be presented on the display 211 (and the page 100 to no longer be visible on the display 211). Upon detecting that the user 204 has altered focus from the page 100 to the second page 302, and in an embodiment where the event monitor module 216 is not configured to generate the timestamp that corresponds to TIME 1, the event monitor module 216 can generate a timestamp, wherein the timestamp identifies a time when the focus of the user 204 altered from the page 100 to some other content (TIME 2).

Subsequently, at TIME 3, the event monitor module 216 can detect that the first tab has been selected by the user 204, and thus the page 100 is again presented on the display 211 of the client computing device 202 (and therefore the focus of the user has returned to the page 100). Upon detecting that the focus of the user 204 has returned to the page 100, the event monitor module 216 can transmit one of the timestamp for TIME 1 or the timestamp for TIME 2. Additionally, and optionally, the event monitor module 216 can transmit identifiers for search results that were presented on the page 100 at TIME 1. As will be described below, the selector module 232 can use the identifiers for the search results to compare search results identified by the search module 228 in the second search with search results represented on the page 100 based upon the first search. Moreover, in an embodiment where the server computing system 206 fails to retain the query, the event monitor module 216 can transmit the query (and metadata assigned to the query by the intent determiner module 230) to the server computing system 206, whereupon the search module 228 can perform the second search based upon the query.

Figure 4:
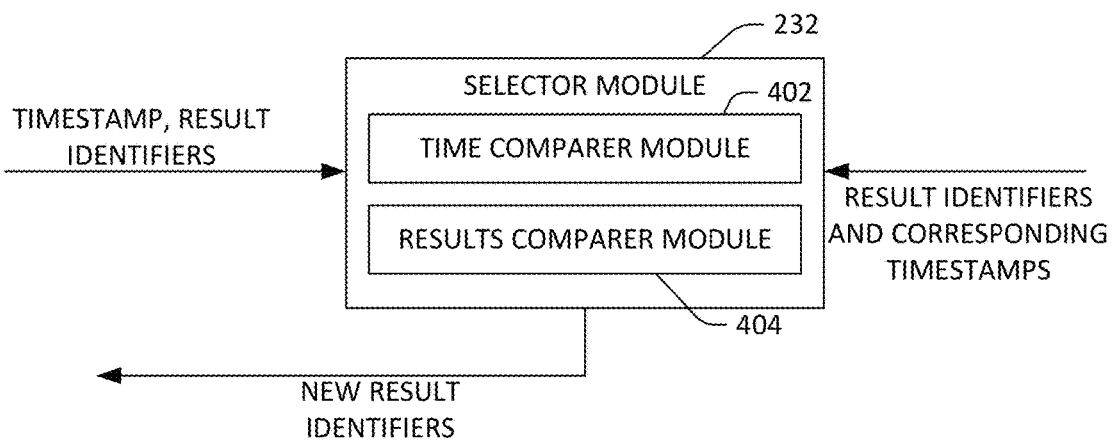
FIG. 4 is a functional block diagram of an exemplary selector module that identifies a search result that was published subsequent to a user issuing a query to a search computing system.

Referring now to FIG. 4, a functional block diagram of the selector module 232 is illustrated. The selector module 232 receives the timestamp output by the event monitor module 216. As noted above, the selector module 232 may also optionally receive identifiers for the search results presented on the page 100 from the event monitor module 216. Alternatively, the server computing system 206 may retain the identifiers for the search results represented on the page 100, wherein such search results were identified by the search module 228 in the first search based upon the query. When the server computing system 206 retains the identifiers for the search results, the event monitor module 216 need not output the identifiers for the search results.

The selector module 232 includes a time comparer module 402, As indicated previously, the selector module 232 receives search results identified by the search module 228 as being relevant to the query with respect to the second search. The time comparer module 402 compares timestamps of search results returned by the search module 228 with the timestamp generated by the event monitor module 216. The selector module 232 then filters search results from the search results provided by the search module 228 that have timestamps assigned thereto that are prior to the timestamp generated by the event monitor module 216. Put differently, the selector module 232 filters search results from the search results returned by the search module 228 that were published when the search module 228 performed the first search.

The selector module 232 also includes a results comparer module 404 that is configured to compare search results represented on the page 100 with the search results identified by the search module 228 in the second search. For example, between the time that the user 204 initially submitted the query to the server computing system 206 and the time that the focus of the user 204 returned to the page 100, a webpage identified by the search module 228 during the first search (and represented on the page 100) may have been updated, and thus may have a timestamp assigned thereto that is subsequent to the timestamp generated by the event monitor module 216. The webpage, however, was represented in the index 226 during the first search performed by the search module 228. Accordingly, the results comparer module 404 can filter such webpage from results that are to be included in the canvas 104.

In an exemplary embodiment, the results comparer module 404 can compare content of the webpage at the different times. More specifically, the results comparer module 404 can detect that the webpage was represented in the computer-readable index 226 during the first search, and can also detect that the webpage has a timestamp assigned thereto that is subsequent the timestamp generated by the event monitor module 216. The results comparer module 404 can compare a cached version of the webpage (that represents content of the webpage at the time that the search module 228 performed the first search) with a current version of the webpage. If an amount of change between the content of the cached version of the webpage the content of the current version of the webpage is below a threshold, the results comparer module 404 can filter such webpage from being represented in the canvas 104, Alternatively, when the results comparer module 404 determines that the content of the current webpage is much different from the content of the cached version of the webpage, the results comparer module 404 can cause a representation of the webpage to be included in the canvas 104. When there are multiple search results that are to be represented in the canvas 104, the selector module 232 can rank such search results based upon timestamps corresponding thereto, wherein search results having more recent timestamps assigned thereto are ranked higher than search results having later timestamps assigned thereto. In another example, the selector module 232 can rank the search results based upon relevance scores computed for the search results by the search module 228.

Figure 5:
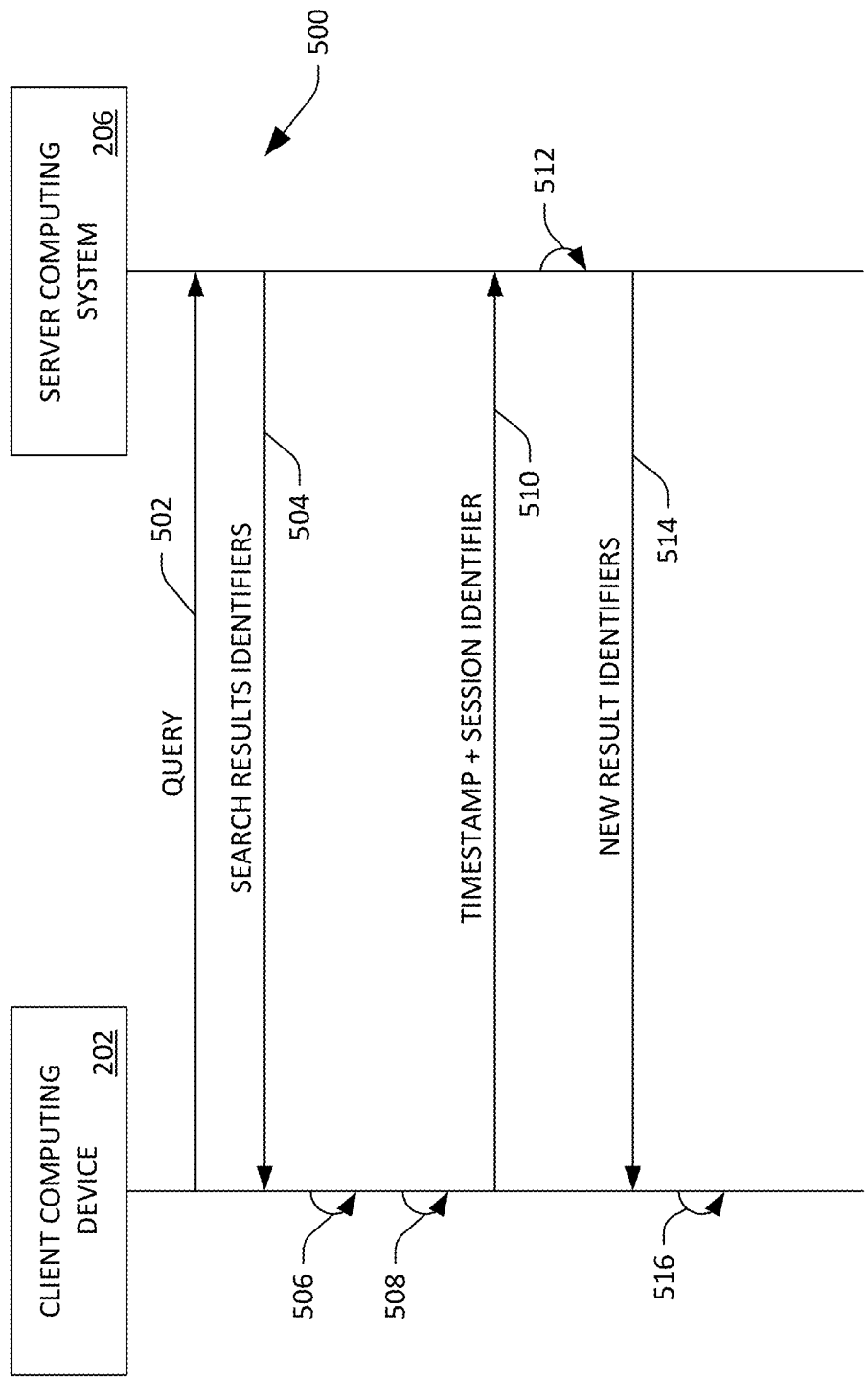
FIG. 5 is a communications diagram that illustrates exemplary communications between a client computing device and a server computing device in connection with presenting a "while away" canvas to a user of the client computing device.

FIG. 5 depicts a communications diagram 500 that illustrates communications between the client computing device 202 and the server computing system 206 in connection with updating the page 100 to include the canvas 104. At 502, the user 204 sets forth a query in the query field 102 and the client computing device 202 transmits the query to the server computing system 206, The server computing system 206, upon receipt of the query, provides the query to the search module 228. The intent determiner module 230 ascertains an information retrieval intent of the user 204 based upon the query and optionally based upon previous interactions of the user with SERP(s) during a search session. For example, the intent determiner module 230 can assign metadata to the query that is indicative of a topic to which the query is germane. For instance, when the query is "bulls", the intent determiner module 230 can assign the metadata "finance" to the query rather than the metadata "sports". As indicated previously, the intent determiner module 230 can make such determination based upon previous queries issued in a search session by the user 204, a user profile of the user 204, etc. The search module 228 searches the computer-readable index 226 based upon the query and optionally based upon the metadata assigned to the query by the intent determiner module 230. The search module 228 can identify search results based upon the query and, at 504, transmits identifiers for the search results to the client computing device 202.

Additionally, the server computing system 206 can retain the query, the metadata assigned to the query, and the identifiers for the search results that were transmitted to the client computing device 202 at 504. In another exemplary embodiment, the server computing system 206 can transmit the metadata assigned to the query by the intent determiner module 230 to the client computing device 202 at 504.

Upon receiving the identifiers for the search results, the client computing device 202 generates the page 100, wherein the page 100 includes links to the search results identified by the identifiers for the search results. Thus, for example, the client computing device 202 renders a conventional SERP. Additionally, the event monitor module 216 can generate a first timestamp that identifies the time that the identifiers for the search results were received from the server computing system 206.

At 506, the event monitor module 216 detects that focus of the user 204 has altered from the page 100 to some other content (but that the user 204 has not closed the page 100). In another exemplary embodiment, at 506 the event monitor module 216 can generate a second timestamp that identifies the time when the focus of the user 204 altered from the page 100 to the other content.

At 508, the event monitor module 216 detects that focus of the user 204 has returned to the page 100. It can be ascertained that between the time that the focus of the user 204 left the page 100 and the focus of the user 204 returned to the page 100, the user 204 may have looked at a variety of other content (multiple different pages in different tabs of a browser, information from different applications, etc.). At 510, in response to the event monitor module 216 detecting that the focus of the user 204 has returned to the page 100, the client computing device 202 transmits one of the first timestamp or the second timestamp generated by the event monitor module 216 to the server computing system 206. In addition, in an exemplary embodiment, the client computing device 202 can transmit a session identifier to the server computing system 206, wherein the server computing system 206 can retrieve the query, the metadata assigned to the query, and identifiers of search results represented on the page 100. In another exemplary embodiment, at 510, the client computing device 202 can re-transmit the query to the server computing system 206. Additionally, the client computing device 202 can transmit metadata assigned to the query and identifiers of search results represented on the page 100 to the server computing system 206.

At 512, the search module 228 performs a second search over the computer-readable index 226 based upon the query (and optionally the metadata assigned to the query by the intent determiner module 230). The search module 228 identifies second search results based upon the query, wherein there may be a significant amount of overlap between the search results identified in response to receiving the query at 502 and search results identified at 512. The selector module 232 identifies, for example, a search result from the second set of search results that: 1) has a second timestamp assigned thereto that is subsequent the timestamp received from the client computing device 202 at 510; and 2) is represented in the search result identifiers transmitted to the client computing device 202 at 504. Hence, the selector module 232 identifies a search result that was published subsequent to, for example, when the user 204 submitted the query and optionally subsequent to when the event monitor module 216 detected that the focus of the user 204 had left the page 100. At 514, data that is representative of the search result is transmitted from the server computing system 206 to the client computing device 202, and at 516 the application 214 updates the page 100 to include the canvas 104, wherein the search result identified at 512 is represented in the canvas 104.

It is again highlighted that the technologies described herein are different from conventional push notification systems, where notifications regarding a topic are continuously pushed to an end user. In contrast, the canvas 104 is generated and presented upon the event monitor module 216 detecting that: 1) the page 100 was loaded by the application 214 and displayed on the display 211; 2) the focus of the user 204 shifted away from the page; and 3) the focus of the user 204 subsequently returned to the page 100.

It is also to be understood, however, that other embodiments are also contemplated. For example, instead of performing the second search and transmitting updated search results upon receiving an indication that focus of the user has returned to the page, the server computing system 206 can perform the second search and transmit updated search results upon passage of a predefined amount of time and/or when load of the server computing system 206 is low (e.g., beneath a predefined threshold). For example, upon receiving the search results identifiers at 504, the client computing device 202 can initiate a timer and compare a time of the timer with the predefined amount of time. When the time of the timer matches the predefined amount of time, the client computing device 202 can transmit the timestamp and the session identifier at 510. In another exemplary embodiment, the server computing system 206 can initiate a timer upon transmitting the search results at 504 (and may cease the timer upon receiving an indication from the client computing device 202 that the user has ended the search session), When the time of the timer matches the predefined amount of time, the server computing system 206 performs the second search and transmits the new result identifiers at 514. Additionally, as mentioned above, the server computing system 206 can perform the second search when load of the server computing system 206 is identified as being low, thereby efficiently utilizing processing resources of the server computing system 206.

Figure 6:
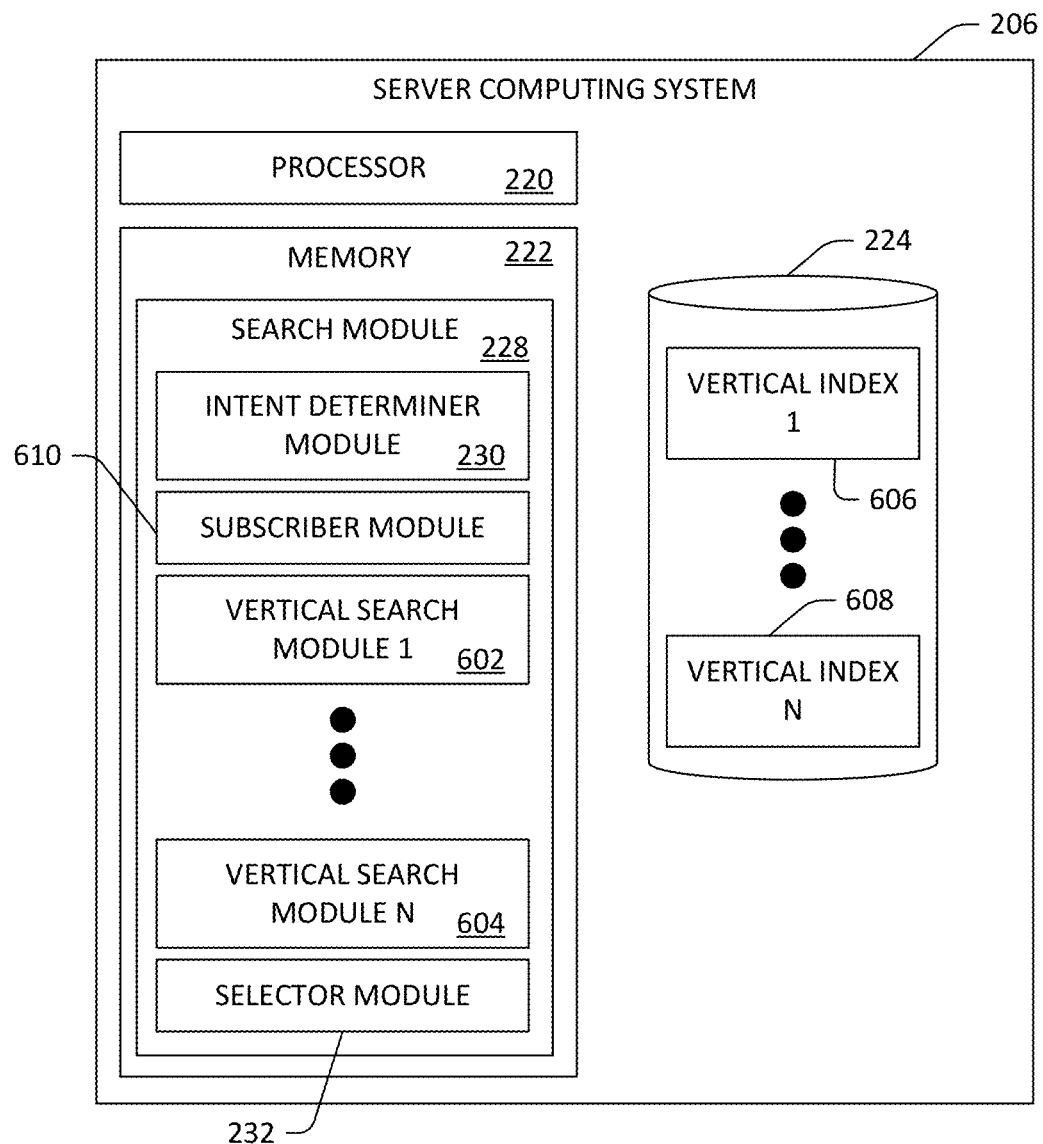
FIG. 6 is a functional block diagram of an exemplary server computing system, wherein several vertical search modules can subscribe to a "while away" canvas to provide updated search results to users.

Now referring to FIG. 6, a functional block diagram of the server computing system 206 is illustrated. The server computing system 206 includes the processor 220, the memory 222, and the data store 224. The memory 222 includes the search module 228, the intent determiner module 230, and the selector module 232. In the exemplary server computing system 206 depicted in FIG. 6, the search module 228 includes several vertical search modules: a first vertical search module 602 through an Nth vertical search module 604. Further, the data store 224 includes several vertical indexes: a first vertical index 606 through an Nth vertical index 608, wherein the vertical indexes 606-608 respectively correspond to the vertical search modules 602-604. Accordingly, the first vertical search module 602 is configured to search over the first vertical index 606 and the Nth vertical search module 604 is configured to search over the Nth vertical index 608.

The vertical indexes 606-608 include information that is respectively germane to different domains. For example, the first vertical index 606 can index webpages that include content that is germane to the topic "finance", a second vertical index can index webpages that include content that is germane to the topic "news", a third vertical index can index webpages that include content that is germane to the topic "sports", and the Nth vertical index 608 can index webpages that include content that is germane to the topic "shopping". In a nonlimiting example, one or more of the vertical indexes 606-608 may be limited to indexing webpages that belong to websites in a predefined list of websites. For example, as indicated previously, the first vertical index 606 may index webpages that include content that is germane to the topic "finance"; the webpages indexed in the first vertical index 606 may each belong to a website in a predefined set of websites that pertain to finance. This allows for the first vertical index 606 to be updated relatively frequently, as a crawler need not search over an entirety of the World Wide Web.

The search module 228 additionally includes a subscriber module 610 that is configured to subscribe the vertical search modules 602-604 to the canvas module 217 based upon the query set forth by the user 204 and metadata assigned to the query by the intent determiner module 230. For example, the search results represented in the page 100 based upon the first search performed by the search module 228 may include a search result retrieved by the first vertical search module 602. Upon receiving an indication that the query (and metadata assigned thereto) is germane to the domain that corresponds to the first vertical search module 602, the first vertical search module 602 can subscribe to the canvas module 217 by way of the subscriber module 610. Thus, the subscriber module 610 can generate a subscription such that when the event monitor module 216 transmits the timestamp to the server computing system 206, the subscriber module 610 can identify the first vertical search module 602 as subscribing to the canvas module 217. Accordingly, the subscriber module 610 can provide the query to the first vertical search module 602 to perform a second search based upon the query; the first vertical search module 602 then searches over the first vertical index 606 and identifies search results that are relevant to the query. The selector module 232 can then select a search result from such search results based upon the search result having a timestamp that is subsequent to the timestamp received from the event monitor module 216.

In an exemplary embodiment, multiple vertical search modules can subscribe to the canvas module 217. Thus, for example, the Nth vertical search module 604 can indicate that each time that a search result identified by the Nth vertical search module 604 is represented on a page, the Nth vertical search module 604 is to be called when attention of the user 204 returns to the page. In an exemplary embodiment, the vertical search modules 602-604 can handle formatting of presentation of search results in the canvas 104.

Figure 7:
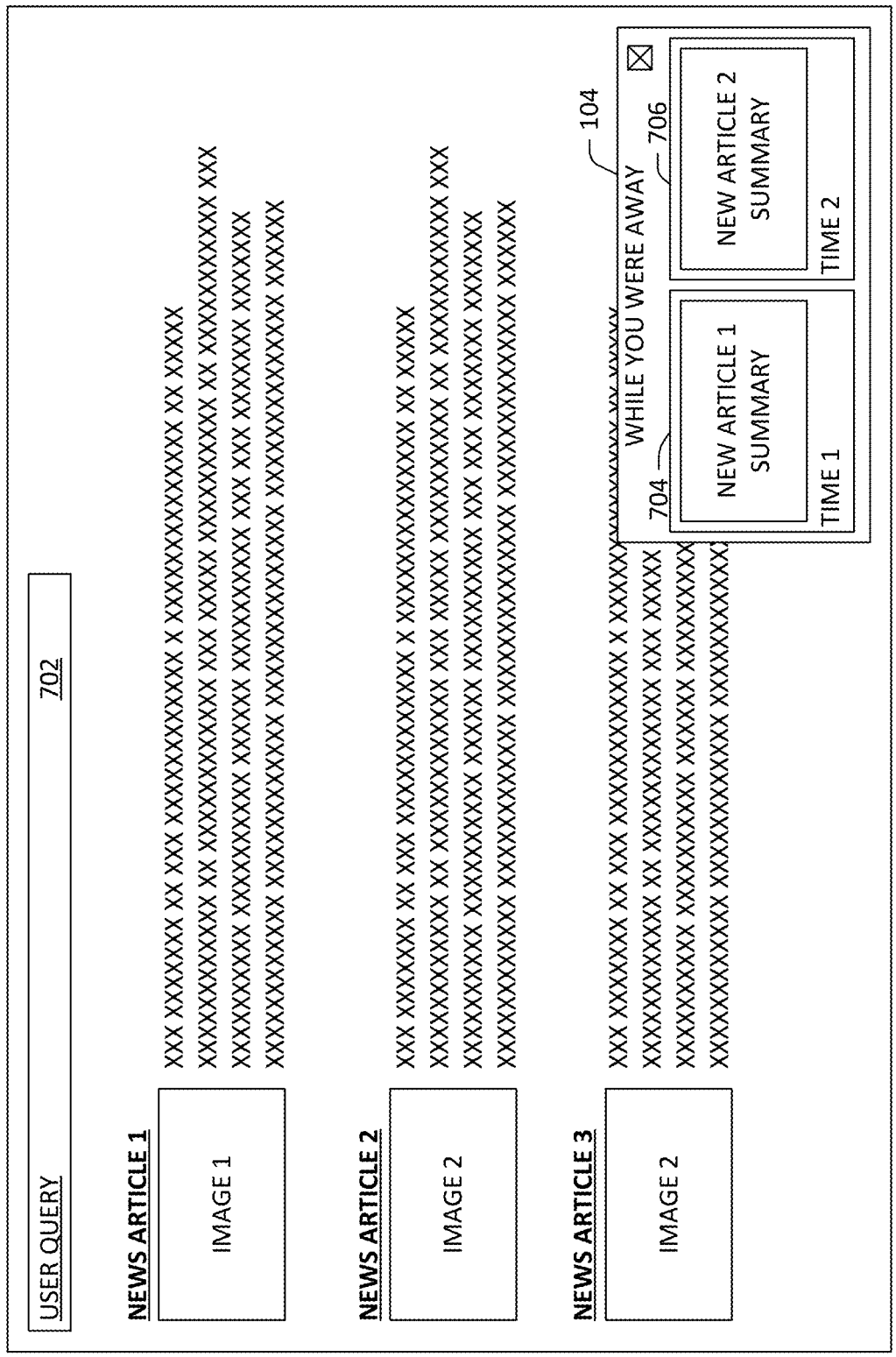
FIG. 7 depicts an exemplary news page with a "while away" canvas presented thereon.

Turning now to FIG. 7, another exemplary page 700 with the canvas 104 presented thereon is illustrated. The page 700 includes a user query field 702, wherein the user 204 can set forth a query by way of such field 702. In an example, the page 700 may be a page of a news site, and the user query set forth in the field 702 may be related to a news item. The page 700 includes links to several webpages that have been published by the news website.

The page 700 also includes the canvas 104, wherein the canvas 104 includes a first representation 704 of a first electronic news article and a second representation 706 of a second electronic news article. The first representation 704 may include a first article summary (which may include an image, a video, text describing the article, etc.) and a first time when the first electronic new article was published on the website. Similarly, the second representation 706 includes a second article summary and a second time that identifies when the second electronic news article was published on the website. As described above, the canvas 104 can depict representations of news articles that were published subsequent to when the user 204 initially set forth the user query in the field 702 and prior to when the event monitor module 216 detected that attention of the user 204 returned to the page 700 (from some other page). The page 700 is presented to illustrate that the canvas 104 can be presented on a page that is not a SERP but is instead a page belonging to a news website.

Figure 8:
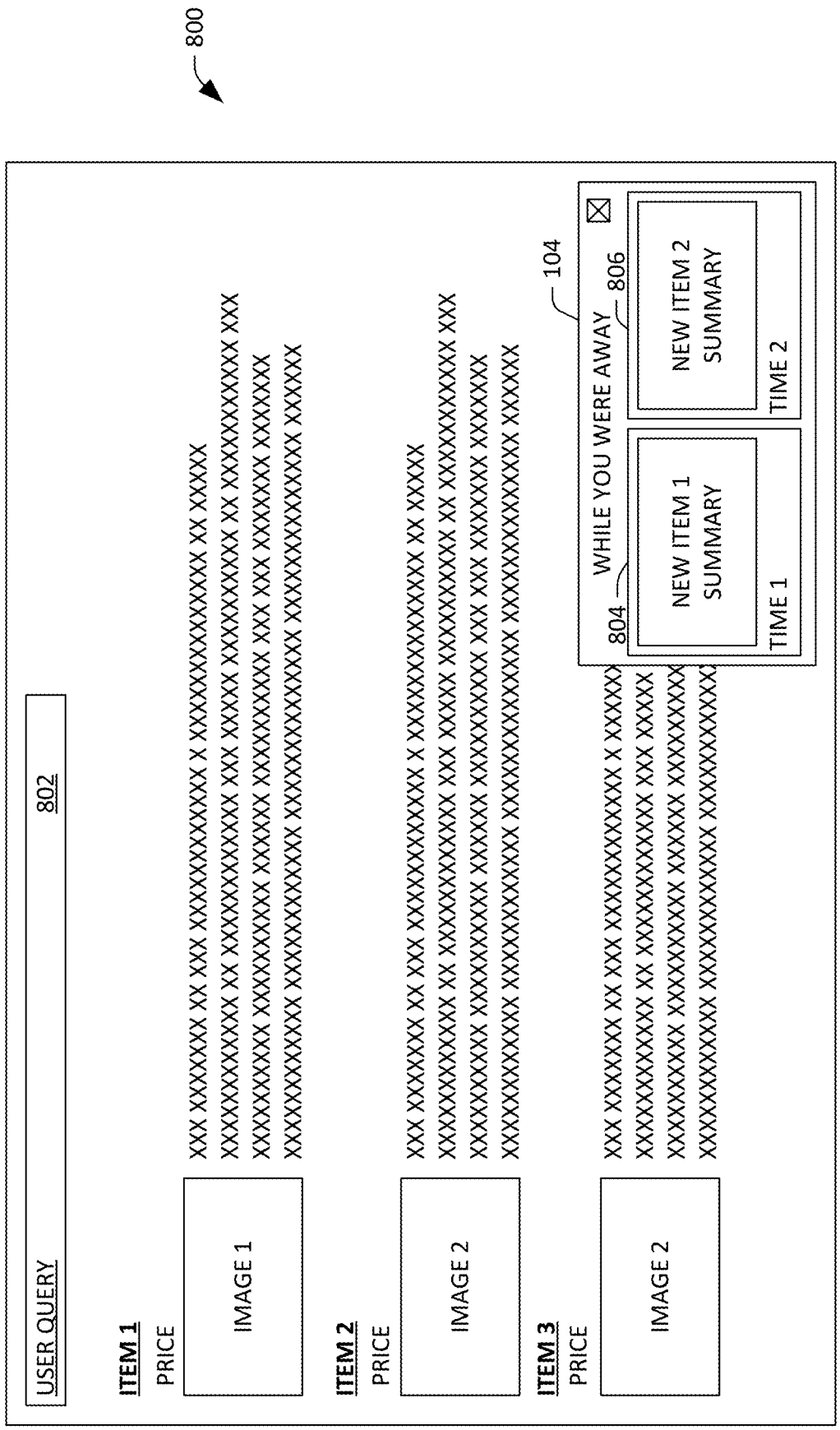
FIG. 8 depicts an exemplary marketplace page with a "while away" canvas presented thereon.

Now referring to FIG. 8, another exemplary page 800 with the canvas 104 presented thereon is illustrated. The page 800 belongs to a marketplace website (such as an online auction website), wherein webpages of the website offer items for acquisition. The page 800 includes a user query field 802, within which the user 204 can set forth a query related to an item that the user 204 is interested in purchasing. The page 800 also includes a ranked list of item representations that represent items deemed to be relevant to the query submitted by the user 204 by way of the field 802. The page 800 further includes the canvas 104, which includes a first representation 804 of a first item deemed to be relevant to the query and a second representation 806 of a second item deemed to be relevant to the query. The representations 804 and 806 represent webpages where items can be purchased, wherein such webpages were published by the marketplace website subsequent to the user initially setting forth the query in the field 802. Thus, the canvas 104 presents to the user 204 identities of items that were not available for purchase when the user 204 initially set forth the query.

Figure 9:
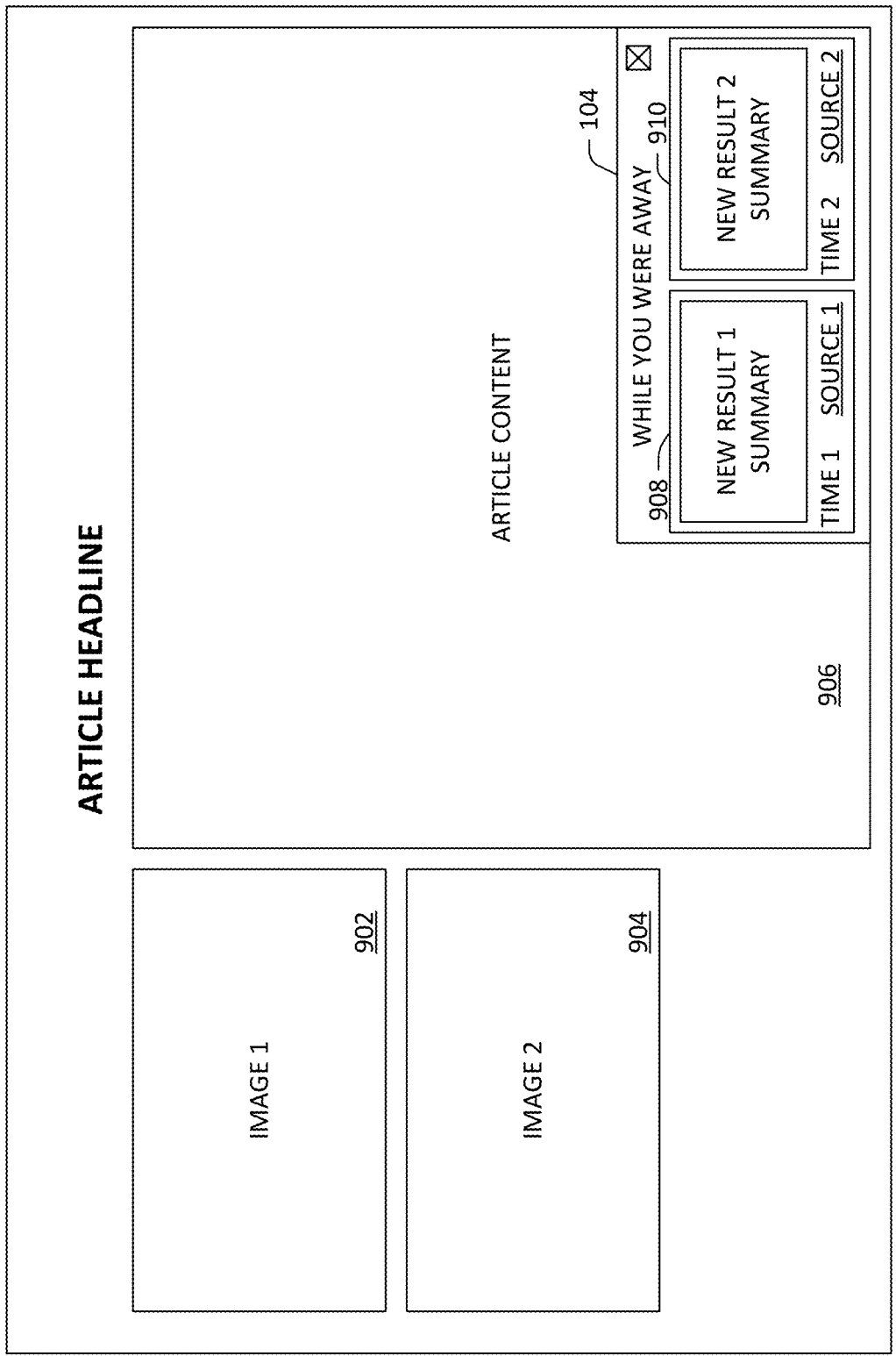
FIG. 9 depicts an exemplary new page with a "while away" canvas presented thereon.

Now referring to FIG. 9, yet another exemplary page 900 is illustrated. The page 900 depicts an article, wherein the article was identified as a search result upon a search engine receiving a query from the user 204, and further wherein the page 900 was reached after the user 204 clicked a link in a SERP that represents the article. The exemplary page 900 includes images 902 and 904 and article content 906, The page 900 was previously displayed on the display 211, and subsequently the event monitor module 216 has detected that focus of the user 204 has altered from the page 900 to some other content (without the page being closed). The event monitor module 216 can then detect that the focus of the user 204 has returned to the page 900, resulting in the canvas 104 being presented on the page 900. Representations 908 and 910 of search results are included in the canvas 104 based upon the query submitted by the user 204 that caused the page 900 to be represented in the SERP. In the example shown in FIG. 9, it is presumed that the user 204 remains interested in content related to the query. Further, in this example, the page 900 can be rendered in a viewer of the search engine. More specifically, a list of links to search results can be presented in a SERP of the search engine, wherein the SERP is presented on a webpage of a website of the search engine. The search engine can cache one or more of the pages represented in the links presented on the SERP. When the user 204 selects a link that corresponds to the page 900, the page 900 is presented in a viewer of the search engine and is therefore presented in a webpage that belongs to the website of the search engine. Accordingly, the event monitor module 216 can detect when focus of the user 204 leaves the page 900 and when focus of the user 204 returns to the page. Further, the search module 228 can perform a search based upon the query that was used to present the list of search results on the SERF.

With reference now to FIG. 10, an exemplary page 1000 that can be presented on a display of a mobile computing device (such as a mobile telephone) is illustrated. The page 1000 includes a field 1002, wherein a user query can be set forth in the field 1002. With respect to the example page 1000, the event monitor module 216 can detect that a new browser tab has been opened and/or a new application has been opened, and thus the page 1000 transitions from being displayed on the display 211 to not being displayed on the display 211. The event monitor module 216 can further detect when the page 1000 is re-presented on the display 211 of the client computing device 202. Because the display space is somewhat limited on mobile computing devices, rather than presenting the canvas 104 that includes representations over a portion of the page 1000, a button 1004 can be presented on the bottom of the page 1000. Upon the button 1004 being selected, representations of search results with publication times subsequent to the time that the user submitted the query by way of the field 1002 can be presented.

Figure 11:
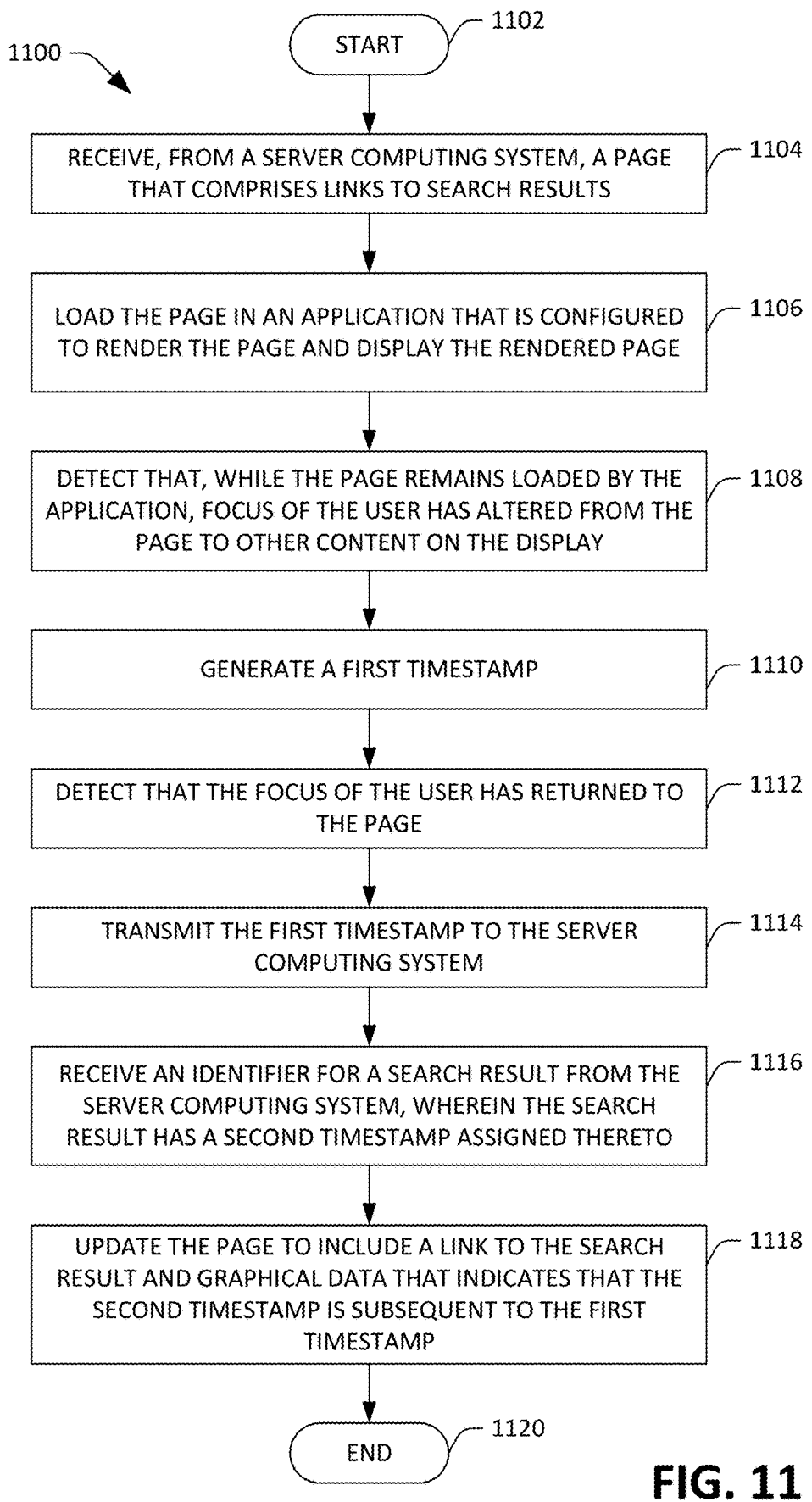
FIG. 11 is a flow diagram illustrating an exemplary methodology performed on a client computing device for presenting a "while away" canvas on a display of the client computing device.
Figure 12:
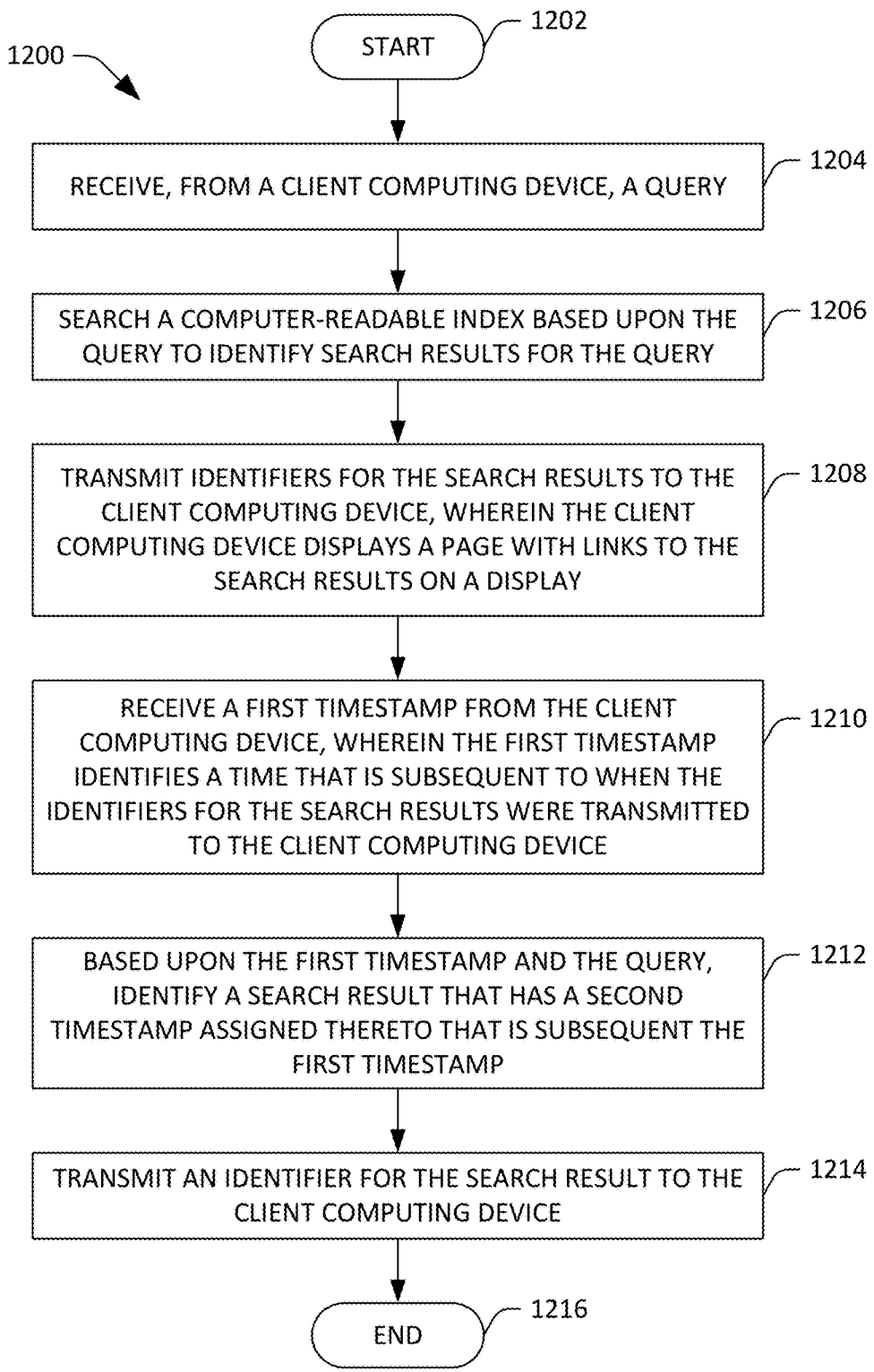
FIG. 12 is an exemplary flow diagram illustrating a methodology for transmitting identifiers for search results to a client computing device for inclusion in a "while away" canvas.

FIGS. 11-12 illustrate exemplary methodologies relating to updating a page to include a "while away" canvas. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 11, an exemplary methodology 1100 for updating a page to include a "while away" canvas is illustrated. A client computing device (such as the client computing device 202) can perform the methodology 1100. The methodology 1100 starts at 1102, and at 1104 a page is received from a server computing system, wherein the page comprises links to search results that were identified as being relevant to a query set forth by a user of the client computing device.

At 1106, the page is loaded in an application (e.g., a web browser) that is configured to render the page and display the rendered page on a display of the client computing device.

At 1108, while the page remains loaded by the application, focus of the user is detected as having left the page focus of the user has switched from the page to other graphical content, the client computing device has entered sleep mode, indicating that the user has left the computer, etc.).

At 1110, a first timestamp is generated that identifies one of: 1) a time when the focus of the user is detected as leaving the page; or 2) a time when the links to the search results were detected as being displayed on the display.

At 1112, subsequent to generating the first timestamp and further subsequent to detecting that the focus of the user has left the page, focus of the user is detected as having returned to the page. For example, it can be detected that the user has selected a browser tab that includes the page, causing the page to be displayed on the display of the client computing device.

At 1114, in response to detecting that the focus of the user has returned to the page, the first timestamp is transmitted (by way of a network connection) to the server computing system. The server computing system identifies a search result based upon the query, wherein the search result has a second timestamp assigned thereto that is subsequent the first timestamp (e.g., the search result was published after the time identified by the first timestamp).

At 1116, an identifier for the search result is received from the server computing system by way of the network connection. For example, the identifier may include a URL that points to the search result and information extracted from the search result (e.g., a snippet, an image, etc.).

At 1118, upon receiving the identifier for the search result, the page is updated to comprise: 1) a link to the search result; and 2) graphical data that indicates that the second timestamp assigned to the search result is subsequent to the first timestamp. The methodology 1100 completes at 1120.

Now referring to FIG. 12, an exemplary methodology 1200 performed at a server computing device is illustrated, wherein the methodology 1200 facilitates presenting a "while away" canvas on a page displayed at a client computing device that is in network communication with the server computing device. The methodology 1200 starts at 1202, and at 1204 a query is received from the client computing device.

At 1206, a computer-readable index is searched based upon the query to identify search results for the query.

At 1208, identifiers for the search results (e.g., URLs of the search results and optionally additional information about the search results) are transmitted to the client computing device. An application executing on the client computing device displays a page on a display of the client computing device based upon the identifiers for the search results, wherein the page comprises links to the search results.

At 1210, subsequent to transmitting the identifiers for the search results to the client computing device, a first timestamp is received from the client computing device, wherein the first timestamp identifies a time that is subsequent to when the identifiers for the search results were transmitted to the client computing device.

At 1212, a search result is identified based upon the first timestamp and the query, wherein the search result has a second timestamp assigned thereto that is subsequent the first timestamp. Further, the search result is identified due to the second timestamp being subsequent the first timestamp.

At 1214, an identifier for the search result is transmitted to the client computing device, wherein the client computing device, in response to receiving the identifier for the search result, updates the page to comprise a link to the search result and graphical data that indicates that he search result was published subsequent to the identifiers for the search results being transmitted to the client computing device. The methodology 1200 completes at 1216.

Figure 13:
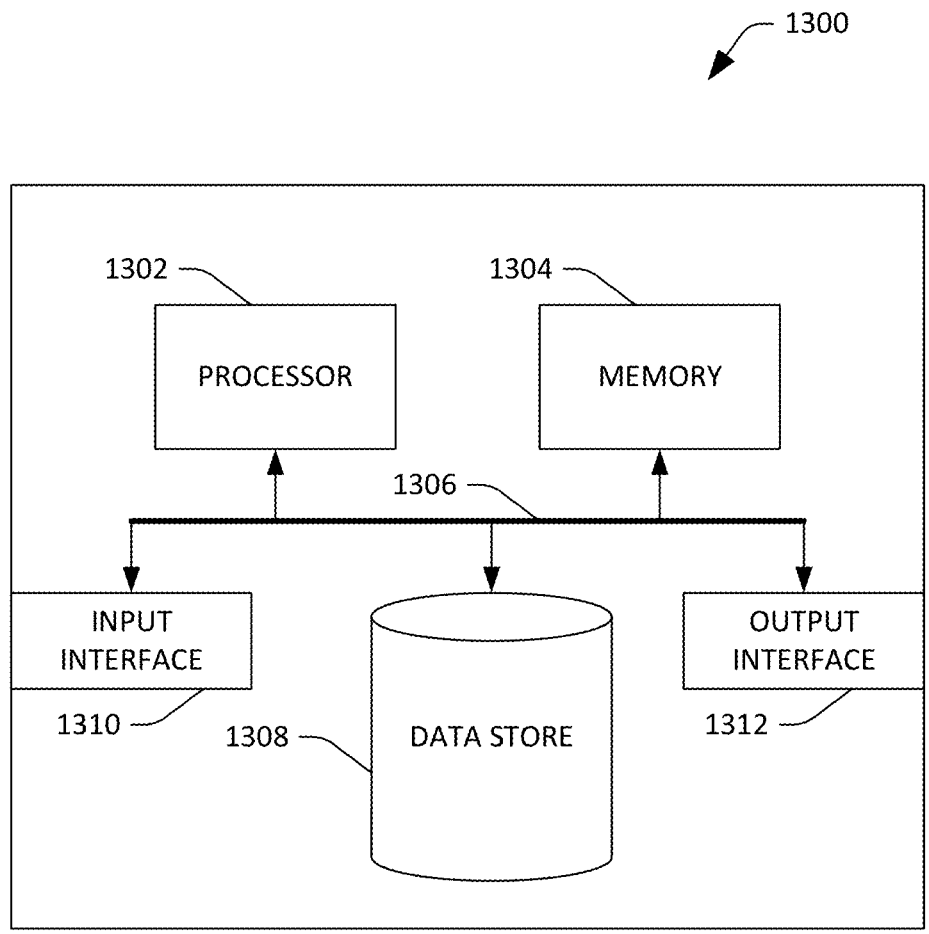
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be used in a system that facilitates presenting a "while away" canvas on a page being displayed on a client computing device. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store search results, timestamps, queries, etc.

The computing device 1300 additionally includes a data store 1308 that is accessible by the processor 1302 by way of the system bus 1306. The data store 1308 may include a computer-readable index to web pages, search logs, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A client computing device comprising:
    a processor;
    a display that is operably coupled to the processor; and
    memory storing instructions that, when executed by the processor, cause the processor to perform acts comprising:
        displaying a search engine results page (SERP) in a first tab of a web browser on the display, where the SERP comprises links to search results on the display, and further wherein the search results are based upon a query set forth by a user of the client computing device to a search engine;
        subsequent to displaying the SERP in the first tab of the web browser, detecting that the user has selected a second tab of the web browser such that the SERP is no longer displayed on the display;
        generating a first timestamp that is indicative of one of: a) a time when the selection of the second tab of the web browser was detected; or b) a time when the SERP was initially displayed in the first tab of the web browser;
        subsequent to generating the first timestamp and further subsequent to detecting that the user has selected the second tab of the web browser, detecting that the user has selected the first tab of the web browser that includes the SERP;
        in response to detecting that the user has selected the first tab of the web browser, transmitting, by way of a network connection, the first timestamp to the search engine;
        receiving, from the search engine, an identifier for a webpage identified by the search engine based upon the query, wherein the webpage has a second timestamp assigned thereto that indicates that the webpage includes content that was generated after the SERP was initially displayed in the first tab of the web browser; and
        upon receiving the identifier for the webpage, partially overlaying the SERP with a canvas, where the canvas includes:
            a link to the webpage; and graphical data that indicates that the webpage includes content that was generated after the SERP was initially displayed in the first tab of the web browser.

2. The client computing device of claim 1, the acts further comprising:

prior to initially displaying the SERP in the first tab of the web browser, transmitting the query to the search engine, wherein the search results are identified by the search engine based upon a search performed over a computer-readable index, and further wherein the client computing device receives identifiers for the search results from the search engine, whereupon the client computing device displays the SERP in the first tab of the web browser; and in response to detecting that the user has selected the first tab of the web browser after selecting the second tab of the web browser, transmitting, by way of the network connection, the query to the search engine.

3. The client computing device of claim 2, the acts further comprising:

subsequent to transmitting the query to the search engine, receiving from the search engine metadata that was assigned to the query by the search engine, the metadata indicative of a topic that pertains to the query; and in response to detecting that the user has selected the first tab of the web browser, transmitting, by way of the network connection, the metadata, wherein the search engine identifies the search result based upon the metadata.

4. The client computing device of claim 1, wherein the SERP continues to comprise the links to the search result as the canvas is displayed.

5. The client computing device of claim 1, wherein a second webpage is identified by the search engine based upon the query, and further wherein the second webpage has a third timestamp assigned thereto that is subsequent the first timestamp, the acts further comprising:

receiving, from the search engine, an identifier for the second webpage by way of the network connection;

wherein the canvas comprises:
a link to the second webpage; and
second graphical data that indicates that the second webpage includes second content that was generated after the SERP was initially displayed in the first tab of the web browser.

6. The client computing device of claim 1 being a mobile computing device.

7. The client computing device of claim 1, wherein a vertical search module is selected by the search engine from amongst a plurality of vertical search modules based upon a determined information retrieval intent of the user, and further wherein the query is provided to the selected vertical search module, wherein the search result is returned by the vertical search module.

8. A method performed by a search engine that is in network communication with a client computing device, the method comprising:

receiving a query from the client computing device;
searching a computer-readable index based upon the query to identify search results for the query;
transmitting identifiers for the search results to the client computing device, wherein a search engine results page (SERP) is displayed in a first tab of a web browser on a display of the client computing device, and further wherein the SERP comprises links to the search results;

subsequent to transmitting the identifiers for the search results to the client computing device, receiving a first timestamp from the client computing device, wherein the first timestamp identifies a time that when a second tab of the web browser is selected by the user such that the SERP is no longer displayed on the display;

based upon the first timestamp and the query, identifying a webpage, wherein the webpage has a second timestamp assigned thereto that indicates that the webpage includes content generated after the second tab of the web browser was selected by the user; and transmitting an identifier for the webpage to the client computing device, wherein the client computing device displays a canvas that partially overlays the SERP in response to receipt of an identifier of the webpage, where the canvas comprises:
a link to the webpage; and
graphical data that indicates that the webpage was published subsequent to when the second tab of the web browser was selected, wherein the SERP continues to include the links to the search results.

9. The method of claim 8, further comprising:
assigning a topic to the query, wherein the webpage is identified based upon the topic that is assigned to the query.

10. The method of claim 9, further comprising:
identifying a search engine vertical from amongst a plurality of search engine verticals based upon the topic that is assigned to the query, wherein the identified search engine vertical identifies the webpage by searching over computer-readable content that is assigned to the topic.

11. The method of claim 8, further comprising:
subsequent to transmitting the identifiers for the search results to the client computing device, receiving the query a second time from the client computing device.

12. The method of claim 8, further comprising:
subsequent to transmitting the identifiers for the search results to the client computing device, receiving the identifiers for the search results from the client computing device;
comparing the identifiers for the search results with the identifier for the webpage; and
transmitting the identifier for the webpage only upon ascertaining that the identifiers for the search results fail to include the identifier for the webpage.

13. The method of claim 8, further comprising:
comparing the second timestamp with the first timestamp; and
transmitting the identifier for the webpage only upon ascertaining that the second timestamp is subsequent the first timestamp.

14. A server computing system comprising a computer-readable storage medium, the computer-readable storage medium comprises instructions that, when executed by a processor, cause the processor to perform acts comprising:

receiving, from a client computing device that is in network communication with the server computing system, a query;
searching a computer-readable index based upon the query to identify search results for the query;
transmitting identifiers for the search results to the client computing device, wherein a web browser executing on the client computing device displays a search engine results page (SERP) in a first tab of the web browser, and further wherein the SERP comprises links to the search results, and further wherein the server computing system generates a first timestamp that is indicative of when the identifiers for the search results were transmitted to the client computing device;

subsequent to transmitting the identifiers for the search results to the client computing device, receiving a second timestamp from the client computing device, wherein the second timestamp indicates that, subsequent to the identifiers being transmitted to the client computing device, a second tab of the web browser was selected and subsequently the first tab of the web browser was selected, and further wherein the second timestamp identifies a time when the first tab of the web browser is selected such that the SERP is redisplayed;

based upon the first timestamp, the second timestamp, and the query, identifying a webpage, wherein the webpage has a third timestamp assigned thereto that indicates that the webpage was published after the second tab of the web browser was selected; and transmitting an identifier for the webpage to the client computing device, wherein a canvas that partially overlays the SERP is displayed in the first tab of the web browser, the canvas comprising:
 a link to the webpage; and
 graphical data that indicates that the webpage was published subsequent to the second tab of the web browser being selected.

15. The server computing system of claim 14, the acts further comprising:
 assigning a topic to the query, wherein the webpage is identified based upon the topic that is assigned to the query.

16. The server computing system of claim 15, the acts further comprising:
 identifying a search engine vertical from amongst a plurality of search engine verticals based upon the topic that is assigned to the query, wherein the identified search engine vertical identifies the webpage by searching over computer-readable content that is assigned to the topic.

17. The server computing system of claim 14, the acts further comprising:
 subsequent to transmitting the identifiers for the search results to the client computing device, receiving the query a second time from the client computing device.

18. The server computing system of claim 14, the acts further comprising:
 subsequent to transmitting the identifiers for the search results to the client computing device, receiving the identifiers for the search results from the client computing device;
 comparing the identifiers for the search results with the identifier for the webpage; and
 transmitting the identifier for the webpage only upon ascertaining that the identifiers for the search results fail to include the identifier for the webpage.

19. The server computing system of claim 14, the acts further comprising:
 comparing the second timestamp with the first timestamp; and
 transmitting the identifier for the webpage only upon ascertaining that the second timestamp is subsequent the first timestamp.

20. The server computing system of claim 14, wherein the client computing device is a mobile telephone.

* * * * *